(12) United States Patent
Brouwer et al.

(10) Patent No.: US 6,279,124 B1
(45) Date of Patent: *Aug. 21, 2001

(54) METHOD AND SYSTEM FOR TESTING HARDWARE AND/OR SOFTWARE APPLICATIONS

(75) Inventors: Derek J. Brouwer, Louisville; Scott Allan Musson, Arvada; Neal Gordon Staats, Denver, all of CO (US)

(73) Assignee: Qwest Communications International Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/664,490

(22) Filed: Jun. 17, 1996

(51) Int. Cl.[7] .................................... G06F 11/36
(52) U.S. Cl. ............................ 714/38; 709/328
(58) Field of Search ................. 395/183.14, 704, 395/680, 183.21; 714/38, 45, 700, 703, 712, 714, 715, 718, 724, 738, 742, 46–49, 746, 37; 709/300, 310–332; 379/15, 1, 3, 10, 27, 5, 29, 34, 413; 371/25; 455/408; 717/1, 2, 3, 4; 702/119, 123

(56) References Cited

U.S. PATENT DOCUMENTS

| | | | |
|---|---|---|---|
| 4,617,663 | * 10/1986 | Lake et al. ............................ | 371/25 |
| 5,157,782 | * 10/1992 | Tuttle et al. .......................... | 714/45 |
| 5,233,611 | * 8/1993 | Triantafyllos et al. .............. | 371/16.1 |
| 5,359,546 | * 10/1994 | Hayes et al. .......................... | 364/579 |
| 5,390,314 | * 2/1995 | Swanson ................................ | 717/5 |
| 5,495,571 | * 2/1996 | Corrie, Jr. et al. ............... | 395/183.14 |
| 5,544,310 | * 8/1996 | Forman et al. ...................... | 714/31 |
| 5,633,909 | * 5/1997 | Fitch ..................................... | 379/15 |
| 5,671,351 | * 9/1997 | Wild et al. ......................... | 395/183.14 |
| 5,835,566 | * 11/1998 | Cowgill ................................. | 379/10 |

OTHER PUBLICATIONS

Vogel, Peter A., "An Integrated General Purpose Automated Test Environment," ACM 0–89791–608, pp. 61–69, 1993.*
Frohnhoff et al. "An Advanced TMN Test System—TSE–P—" IEEE pp 444–453, 1996.*
Glicker et al. "The Distributed Object Environment: Support for a Distributed Object–based System" ACM pp 293–298, 1992.*

* cited by examiner

*Primary Examiner*—St. John Courtenay, III
(74) *Attorney, Agent, or Firm*—Brooks & Kushman P.C.

(57) ABSTRACT

An adaptable system and method for testing a plurality of hardware and/or software applications. The system and method include a test case generator for generating a plurality of test cases, each test case corresponding to one of the plurality of applications, and a multi-layered interface for communicating between corresponding test cases and applications. The system and method also include means for executing the test cases to generate test data, and means for recording the test data generated during execution of the test cases.

8 Claims, 2 Drawing Sheets

METHOD AND SYSTEM FOR TESTING HARDWARE AND/OR SOFTWARE APPLICATIONS

TECHNICAL FIELD

This invention relates to an adaptable system and method for testing multiple hardware and/or software applications.

BACKGROUND ART

It is well known that tools for automated testing of hardware and software applications, especially telephony based systems, are not widely available. Those tools that are available are specially designed for a particular application or applications, such as the testing of voice mail systems. Such tools are not readily adaptable for testing applications other than those for which they have been specifically designed.

Thus, new automated test systems must be designed and built each time new hardware and/or software applications are developed. This is a time consuming and expensive task. As a result, test systems are not developed for every hardware and/or software application. Many such applications therefore suffer from inadequate testing prior to release.

A need therefore exists for an improved automated testing tool that is readily adaptable for testing a plurality of hardware and/or software applications. Like prior art automated testing tools, such an improved testing system and method would drive a system under test adequately to verify that the system is error free operationally and robust from a load handling perspective. Errors in the system under test, including the device the error occurred on, the instruction that failed, and the actual error number, would be accurately reported. In addition, peg counts and timing would be gathered and reported.

In addition, however, such an improved system and method for testing hardware and/or software applications would take into consideration at every turn that the present projects under test may not reflect future projects due to constant and rapid technological changes. Such a system and method would therefore provide a very modular format so that they may be easily modified to meet the needs of future systems.

More particularly, such a system and method would provide for additional interface libraries (or layers thereof) to be added as new projects requiring testing were developed. Additionally, none of the infrastructure code or system control code would need to be modified in such cases. In that fashion, such a system and method would be capable of working in conjunction with existing test systems.

DISCLOSURE OF THE INVENTION

Accordingly, it is the principle object of the present invention to provide an improved system and method for testing hardware and/or software applications that is adaptable for testing multiple applications.

According to the present invention, then, an adaptable system and method are provided for testing a plurality of applications. The system of the present invention comprises a test case generator for generating a plurality of test cases, each test case corresponding to one of the plurality of applications, and a multi-layered interface for communicating between corresponding test cases and applications. The system further comprises means for executing the test cases to generate test data, and means for recording the test data generated during execution of the test cases.

The method of the present invention comprises providing a test case generator for generating a plurality of test cases, each test case corresponding to one of the plurality of applications, and providing a multi-layered interface for communicating between corresponding test cases and applications. The method further comprises executing the test cases to generate test data, and recording the test data generated during execution of the test cases.

These and other objects, features and advantages will be readily apparent upon consideration of the following detailed description in conjunction with the accompanying drawings.

BEST MODE FOR CARRYING OUT THE INVENTION

For the purposes of explanation only, the basic functions of the system and method of the present invention will first be described herein generally. Thereafter, design specifications concerning such functions will be described in detail. Throughout, the system and method of the present invention will be referred to as the Systest Workbench.

Generally speaking, then, the Systest Workbench has been developed such that new products for testing are the norm and not the exception. It has been assumed, therefore, that though existing products may be a hint of what the new products will be, the technology of such new products will likely be substantially different. It has also been assumed that the interfaces from the Systest Workbench test platform to the system under test will not change radically from project to project. However, the behavior of the hardware will change. For instance, many projects under test via prior art test systems use regular telephone lines as the interface. Though these are all exactly the same for each system, the system under test uses a different interface method to drive the particular special features of their system.

Obviously, then, it is important that the Systest Workbench is not specifically designed for one particular project or even one methodology of operating the hardware and/or software. Instead, it has been assumed that no two projects will access the hardware the same and that each project will require some customization of the access method to perform required tests. Therefore, the entire Systest Workbench has been designed and built with the concept of an expandable, open, and very configurable system. In such a fashion, as new projects for testing come on line a minimum of time is required for the Systest Workbench to handle the new requirements.

Figure 1:
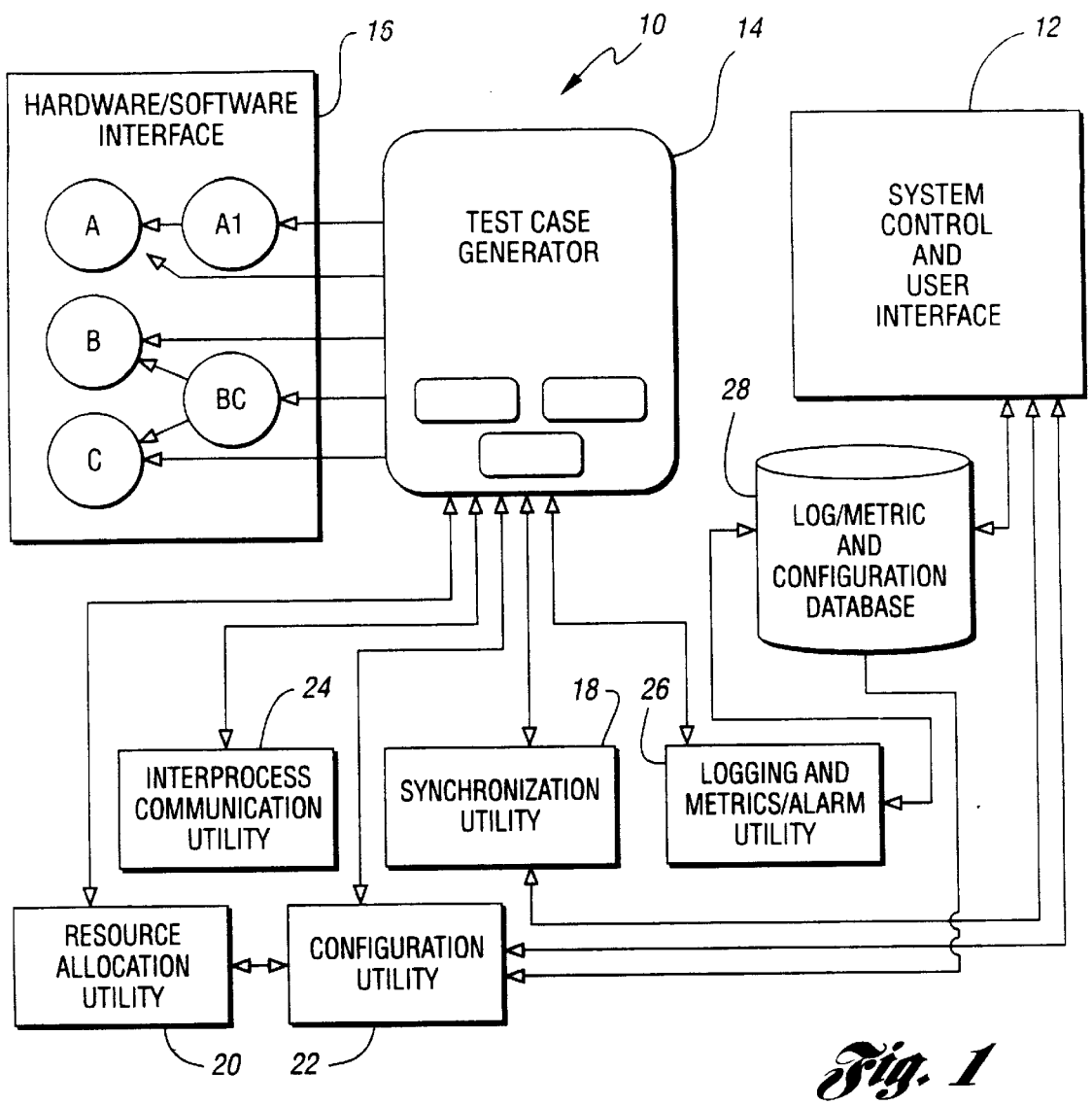
FIG. 1 is block diagram of the system of the present invention.

Referring first to FIG. 1, a block diagram of the system of the present invention is shown, referred to generally by reference numeral 10. The Systest Workbench is broken into three primary pieces: system control (12), test case generator (14), and hardware/software interface (16). Test case generator (14) may be provided with a plurality of test scripts which, save for a few utility libraries, are created by the user.

With regard to system control (12), the front end of the Systest Workbench is a graphic user interface written on the OS/2 Presentation Manager system using CUA '91 methodologies as well as recent enhancements. The system control (12) interface provides an entry point to the Systest Workbench and, like any PM GUI interface, allows the user to select and save display criteria. More particularly, system control (12) allows the user of the Systest Workbench to i) quickly determine the state and status of currently executing tests; ii) perform administrative control operations (start, pause, halt, graceful shutdown, etc.) on the executing or loaded tests; iii) develop test scenarios and suites; iv) manipulate logging/debug messaging levels; v) clear and purge metrics, metric files, and log files; vi) create metric reports; vii) track test execution; viii) maintain system configuration; and ix) review a history of previous test executions and maintain a history of test scenarios and their results.

Tests are described to the Systest Workbench through test cases and scripts via test case generator (14). These scripts can interface to hardware devices and external software test tools through API function calls. The system control (12) portion of the system will start the scripts executing and then monitor their progress. The scripts will report back to the system control (12) through utility library API functions.

The hardware/software interface (16) uses a layered library approach allowing the test scripts to perform actions via API function calls. A common method of accessing devices is defined to script writing. New hardware interface libraries may be added to the system as need for them arises. Presently, Dialogic accessible telephone lines, terminal, video, X.25, and TCP/IP interfaces are supported. This same style interface is used to interface to other systems, other machines on the network, and other test tools. The level of control over the entity, however, drops when interfacing with external systems and test tools. The external systems and test tools supported include XRunner.

The main requirement for script writing is that it be simple enough for one of ordinary skill. Additionally, it is important that the language used to write instructions be familiar to the test engineer. It is also important that the language chosen to operate hardware devices or software objects can be used to orchestrate large load or regression test scenarios.

Rather than specifying a single scripting language, however, the Systest Workbench uses the more practical approach of a defined interface to devices and a framework that supports a number of different languages. These include but are not limited to: i) C; ii) C++; iii) REXX (VREXX, and others); and iv) SOM and DSOM. The interface from each of these languages allows "stdcall" interfaces to OS/2 dynamic link libraries (DLL's). As a result, the interface from each of these languages to the underlying driver software is identical. Likewise, multi-threaded and single threaded languages are supported.

Synchronization is important to the creation of test scripts. Each script manipulates at least one device. If connected devices are not controlled by the same script, two scripts are simply and effectively synchronized across processes and sessions as well as threads. Tests utilizing more than one machine synchronize between scripts on the separate machines over the network. Orchestration of individual scripts into a complete regression or load test is accomplished through a script written in any one of the supported languages. An API is created to handle the more complex aspects of allocating and distributing scripts to hardware devices so that the user of Systest Workbench is insulated from this aspect.

In sum, the tests themselves are coded in one of the supported languages and executed in a controlled fashion by STW. The test writer's interface to the Systest Workbench controlled devices is done through the mechanisms of the script's host language.

Interfacing among hardware devices, software objects, the Systest Workbench control system, and utility libraries is provided through function level API's. An object oriented methodology is emphasized at all times.

In that regard, as previously mentioned, test scripts may synchronized two or more hardware devices to act in concert with each other. To do so, a specific purpose semaphoring system is provided in synchronization utility library (18). All semaphores fall into two categories: mutual exclusion and event. Mutual exclusion semaphores (or mutex) are used to protect a common resource from being accessed by more than one process at a time. Event semaphores are used to indicate that something has occurred somewhere in the system that is of general importance to some other entity.

The synchronization utility (18) accessible to the script writer includes both kinds of semaphores. The synchronization utility (18) allows for i) user created and retrievable semaphore handles; ii) a "syncpoint" API allowing multiple scripts to all be put on hold at a point until all subscribers have reached similar points; iii) event and mutual exclusion style semaphores through a clean and simple bullet proof interface; and iv) automatic event generation based on a user defined dispersion pattern to facilitate realistic load patterns built on the event semaphore base. The semaphores use the "stdcall" call method so that any system which can make calls to external OS/2 DLL's will be able to access this library. This ensures that any test system will be able to synchronize with the STW.

Test scripts typically pass information between themselves in order to assure that the connection or other event through the system under test was correctly achieved. Several types of data must be passable between scripts in the form of messages including numeric, string, and raw data. Inter-script communication may also take place across a network layer. In that event, data is encoded to correctly allow for dissimilar byte swapping and address fixup situations.

A script acting against one or more hardware or software objects is capable of retrieving access to that device via resource allocation utility library (20). This is all departure from the prior art methodology where devices are assigned to scripts (and vice-versa) before execution begins. Allowing the scripts to allocate their own devices makes the Systest Workbench more flexible and dynamic.

Two methods of allocating resources are by name and by type. When a resource is requested by name, a particular object on the system is retrieved for that script. If that resource is busy, the script is returned an error. When resources are allocated by type, Systest Workbench selects an object from the pool of like type objects. To prevent dead lock situations, the user is allowed full control of the resources through the resource allocation utility (20). This utility ensures that a given resource is not multiply allocated. In turn, scripts trap errors from this utility and behave accordingly. As an added feature, the allocation API calls allow a time-out to wait for a resource before returning with an unavailable resource error.

The resource allocation library (20) also reports back to the control system (12) specifications on the resource allocated. This utility also provides proper cleanup of objects allocated and freed. The allocation library (20) also operates across the network so that resources can be allocated from machines other than the one hosting the script.

A configuration utility library (22) is also provided for maintaining information on all the hardware and software objects and the various methods so that they can be configured on the machine (network). The Systest Workbench is designed to allow a layered approach to the objects. The configuration library (22) maintains a database of the objects and their possible usages. For instance, it is possible that phone line style devices could be used in a number of different ways. The configuration library is aware of all these possible usages and the preferred use in the present test scenario.

The configuration library (22) is accessed by the scripts directly and indirectly through the resource allocation library (20). A database interface is also provided to populate the configuration database (24). Data required includes: i) device name and type; ii) type specific data (telephone number, channel number, etc.); iii) hardware interface parameters; iv) functional interface library; and v) software application name and command line parameters. The Systest Workbench is a very open system. This means that as new devices and systems for testing appear, they can be quickly integrated into the Systest Workbench system. The configuration aspect of the system is an important key to its success. The database that it accesses and the interface into that database are easily modified to store the data required by new dissimilar devices and new methods of accessing existing devices.

The Systest Workbench utilizes an object oriented, handle style method for interfacing with the device access libraries. Hardware devices are typically used for more than one system under test. The interface to each of the systems under test is usually different, however, in terms of the packets sent over the hardware line, the method of access, or the desired action in reaction to a similar command. Therefore, three levels of access libraries are provided for every hardware device: i) hardware interface; ii) functional interface; and iii) hybrid interface.

The hardware interface understands the device driver code itself and is capable of bridging the gap between the Systest Workbench system and the various device drivers. This library establishes the base class and methods for accessing the device thereby normalizing the interface to the device. The functional interface supports the most "natural" usage of the device. There can be a number of interfaces to one hardware interface. The interface sits on top of the hardware interface and provides a system under test specific interface to devices. It can also sit on another functional interface and provide additional functionality, pass through to the lower levels, and/or conglomerate commands. The hybrid interface is a form of functional interface that invokes multiple inheritance to interface to two devices as if they were one. These can sit on hardware, functional or other hybrid interfaces as the need arises.

Software and hardware devices appear to the test script writer nearly identically. In such a fashion, interface to software or hardware remains consistent thereby making script writing easier. Obvious differences between the two types of controlled devices are hidden by the interface libraries. Essentially, a software device will be accessed through an interface library that understands the particular software package, access to it, LAN location, protocol, and how to record necessary metrics generated by the software.

The script writer accesses the interface through a call level API. Handles to devices allocated are used to identify the correct device. All calls to the interface will return a non-zero error number or 0 if no error occurred. The device handle is the first parameter. All API calls are stdcall Pascal calling convention unless variable arguments are used, in which case the calling convention is "C". All calls are explicitly exported by the interface library DLL.

The Systest Workbench also provides for the collection of log messages, alarms, and metrics counters. In that regard, the Systest Workbench provides for output from the test scenarios to be accurately collected, appropriate to the test, and easily formatted into reports. Since the systems under test rarely have anything in common with each other, however, it is difficult, if not impossible, to design up front metrics, log messages, and alarms for the Systest Workbench that will be appropriate in all situations—present and future. That being the case, the Systest Workbench is designed for flexibility to allow test engineers to design and specify to the Systest Workbench system the log messages, metrics, and alarms for their particular system under test.

As with the test scripts, the output aspect of the test scenarios are carried out through libraries or utilities accessed via a call level API. The API supports the following commands for peg count style metrics: i) create counter; ii) clear counter; iii) increment counter; and iv) decrement counter. No close messages are necessary as metrics are created for the duration of the test. A flag on the create message is used to determine if a record of when the metric was changed is to be saved as well as information pertaining to who changed the metric. Obviously, the more information saved, the more expensive in terms of performance and disk space a metric becomes. The Systest Workbench therefore provides a fully functional metric capability with information on who changed the metric and when they did it, but also allows this information to be turned off.

It is also important that timer style metrics be captured and supported by the Systest Workbench system. The API calls for this type of metric supports: i) creating a timer; ii) starting an instance of the timer; and iii) stopping (and recording the elapsed time) of the timer. As with counter style metrics, additional information is supported, but can be turned off to improve Systest Workbench performance and minimize the amount of disk space required by the metrics. In the case of timers, instance information is always kept (i.e., each time the timer is started and stopped is recorded separately). The information on who started and stopped the timer and when the instance of timing was used is optional.

Alarms are slightly different from metrics in that they are usually associated with errors or catastrophic occurrences. Alarms are used to indicate completely unexpected errors to the system control interface. The commands supported through the API for the test scripts are: i) alarm creation; and ii) trigger alarm. Alarms can be classified as either warning or error alarms. This classification occurs at the trigger and not the alarm creation so that the same alarm label can be associated with both warnings and errors. When an alarm is triggered, the following information is recorded: i) alarm name/description; ii) time the alarm occurred; iii) where the alarm occurred; and iv) total count of this type of alarm.

Log messages are used to describe specific situations occurring within the test script. This data is usually test oriented, although it may include references to binary stored data such as audio and graphics. Classes of log messages are defined by the script writer to facilitate grouping a particular type of message for administrative purposes. Each log message is also assigned a severity so that the system control interface can determine if the message is to be displayed and recorded or not. The commands supported by the log message API are: i) log class registration; ii) formatted log message output; and iii) audio or video logging, as appropriate. Whenever a log message is output, the time when the message was sent and the originator of the message are saved as well. The default functionality is for the log messages to always be sent. The default can only be overridden by the system control administrative interface.

The interface libraries build and destroy metrics, alarms, and log messages exactly the same as the test scripts. The default output is the lowest level output.

It may be necessary to adjust the counter and timer recording levels after the test has started without interrupting the test to modify the script. Likewise, alarms and log messages may be activated or deactivated. This is accomplished through the system control user interface. Requirements for this interface are: i) counters, timers, alarms, and log messages can be changed to any level of output or shut off completely; ii) the settings for the user output made through the interface take precedence over the test script settings and are saved between the system runs; iii) for log messages, levels of output will be supported including, but not limited to, debug, warning, error, critical (fatal or catastrophic); and iv) alarms and metrics can be displayed in detail or brief, hidden, and cleared.

Alarms are caused either by an alarm trigger command in a test script, or an alarm trigger in an interface library. Alarms cannot be triggered at the system control administration site. Log messages are generated either by commands in the test scripts, or commands in the interface libraries sending messages. Unlike alarms, sending (interjecting) a log message into the system is possible from the system control user interface. Metrics counts are incremented either by increment commands in test scripts, or increment command in the interface libraries. Metrics can not be incremented from the system control interface.

Both log messages and alarms can become very busy from a user interface perspective. At the system control administration application, this is taken into account and given special attention so that the information important to the user is quickly recognizable and available. Those pieces of information that the user wishes to see are not always obvious to the developer. For this reason, the Systest Workbench gives the user as much customization capability as possible.

Alarms are displayed as counters of the various types of alarms triggered. Typically, the user will only be interested in an alarm after it has been triggered. Therefore, a display where the alarms are displayed with color coding (default: green is not triggered, yellow is a triggered warning, red is a triggered error; however, a user by define other colors), a brief description, and a count minimize real estate commitment and provide necessary visual feedback. The individual alarm or class (all warning, all errors, all by type) can then be selected to see a detailed, real-time view complete with the time and location details of the alarm situations. Alarms can be cleared through the interface in both the display and the database. They can be cleared by resetting the alarm counter or by individually removing alarm instances. In either case, the database is purged of those instances of the alarm ever occurring.

Log messages are displayed in a manner similar to the detail views of alarms. The display are real-time so that additional log messages appear at the system control station as they occur. Log messages can be cleared through this interface. When this occurs, it is completely eliminated from the database. Clearing of log messages can be done by individual message, by start/end time, by project, or by test.

Real time display of metrics is done in spread sheet format. The user interface allows for some or all the metrics to be hidden, though they will still accumulate. Metrics can also be cleared through the interface individually or by groups (project, test, all). Clearing metrics does not delete database records, though clearing the database is supported also.

In addition to the real-time display at the system control station, logs and alarms are stored in a database for later review. This database may be fixed in size as determined by the physical constraints of the host system. Once the maximum size is reached, logs and alarm records are removed from the beginning of the database (oldest first) in a block format. Shortage of disk space is in itself an alarm (warning) condition. The stored log/alarm records can be reviewed off line using system control interface as if the tests were still executing.

Metrics can be viewed either as totals by test/project or as totals at a specific time during the system execution. Viewing can also be customized by the user to eliminate unwanted metrics from the display. Graphing of the metrics (simple bar graphics) is also available. Timer metrics are averaged for displays.

Printing of the log/alarm reports is also supported. The ability to chose the scope of the data printed may be limited to: i) start and end times; and ii) types of log/alarms to report. Printing is done through standard OS/2 print queue mechanisms or to file. Anything which can be displayed on the screen regarding metrics can also be printed directly either to a printer or to file. Textual dumps are also possible.

The system control station also supports purging database records by: i) start and end times; ii) project; iii) test instance; and iv) complete. Backing up of the database output records is done through the system control interface and supports backup to diskette or hard drive. The data is formatted in such a way that it can be restored to the system at a later time. Test dumps are supported by printing the log/alarm reports to file as described above.

In the prior art, devices are commonly accessed using device driver libraries. These libraries are difficult to use because of the low level nature of their interface, as well as the generic interface that they yield. The Systest Workbench overcomes this problem by using a layered library approach to insulate the test script writers from the device driver level and provide a normalized interface as well as additional functionality.

A similar method is employed for accessing software test tools thereby allowing the Systest Workbench system to incorporate and integrate those tools. The interface to software objects insulates the script writer from many software specific considerations and ideally appears to the script writer as a very high level interface to a hardware style device.

It is very possible that the software package to be controlled will not be located on the same platform as the STW. When this occurs, the interface library is divided between the Systest Workbench machine and a matching portion on the machine executing the software. The two pieces communicate over the network giving the impression that the software package is local to the Systest Workbench platform.

There is, however, a loss in the amount of control that the Systest Workbench gives the script writer with software devices. The software package will have its own logging, reporting, metrics, and alarms that will be difficult to capture or replicate. Furthermore, test scripts may need to be written for the software package as well, even though they will be controlled by the Systest Workbench system.

In sum, software testing tools are supported as well as possible by the Systest Workbench while maintaining the goal of adaptability. Control may not be as fine as for hardware devices. However, the interface as it appears to the script writer will be the same as for hardware devices.

The devices are accessed through one of three types of interface libraries previously described: i) hardware; ii) functional; or iii) hybrid. To the test script, these all appear the same in terms of interface methods. Their primary difference, however, is the added functionality each successive library adds.

Figure 2:
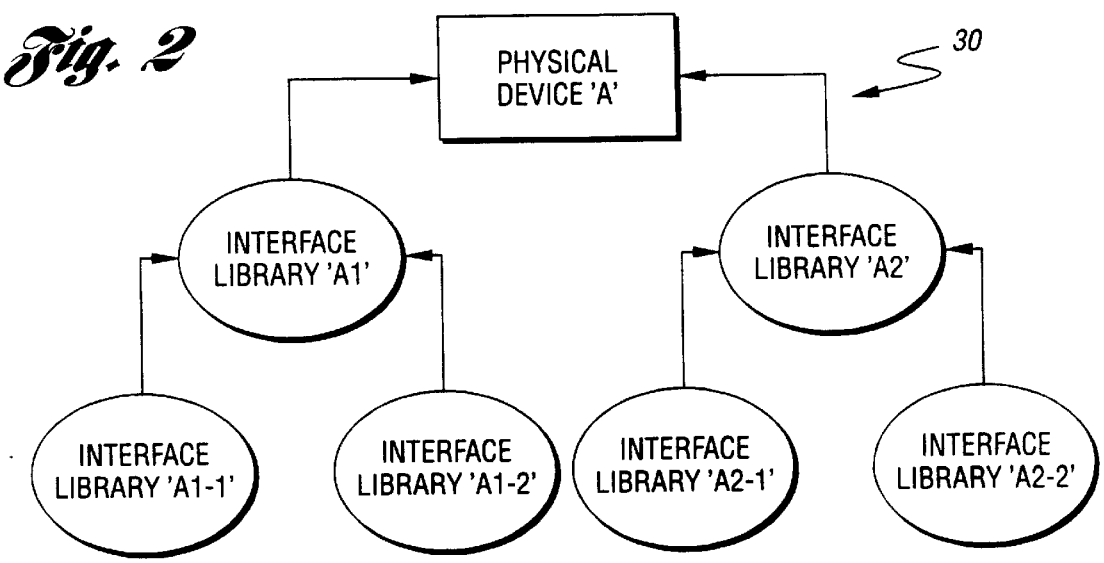
FIG. 2 is block diagram of the application interface associated with the system and method of the present invention.

Referring next to FIG. 2, a block diagram of the application interface associated with the system and method of the present invention is shown, denoted generally by reference numeral 30. As seen therein, a device may only be accessed by one library per allocation from the system. In other words, if a certain device "A" can be accessed from functional libraries "A1" and "A2", and if in turn "A1" can be accessed from two sub-libraries, "A1-1" and "A1-2", a script may not allocate the device "A" through interface library "A1-1" and then access that device through library "A1". Likewise, a device "A" allocated from interface library "A2" cannot be accessed through either "A2-1" or "A2-2". The reason for this is simply that the interface libraries may allocate state data for the device which needs to be modified from within that library each time the library is accessed. It is also probable that a handle to a device at one level may not necessarily be the same at another.

The Systest Workbench also tracks tests within a project and projects themselves. In that regard, the following pieces of information comprise the data record for a test instance: i) project name—entered at the system control interface and registered by the scripts in their start-up routines; ii) test name—also entered at the system control interface and duplicated in the scripts during the start-up; iii) test instance—number assigned in ascending order by the system control application each time a test is started; and iv) date and time—of test start and finish. Such a record is used as a key in the database to associate test output data (logs, metrics, alarms) with particular tests instance runs. Note that the project and test name may be entered at either the control and script areas for more flexibility. The system control data always takes precedence unless the field is left blank.

All run data is saved before exit so that the user is able to rapidly start the system up. This includes, but is not limited to, all window positions, logging levels, and present test names. Log message records contain information on where the log message was sent from, when it was sent, the class of message, and the message itself. The message may include a pointer to externally locate data and such and audio, video or dump files. Alarm records contain information on where the alarm was triggered, what time the alarm was triggered, the alarm name, and the severity. Metric records can be either timer or counter related. Both types include metric name and where the metrics occurred (stopped). Timer metrics also include the start and stop times for the metrics. Counter metrics contain the time that metric was triggered.

Configuration data can become very complex. The hardware interface libraries are known to the configuration utility through the database and entered via the control system application. Additionally, a network style model is provided so that functional and hybrid interface library devices are directly associated with lower level devices.

Referring again to FIG. 1, the basic functions of the Systest Workbench will now be described in greater detail. In that regards it should first be noted that the Systest Workbench is a single application (except for the test scripts) built from small libraries under a Presentation Manager (PM) front end. The Systest Workbench is based over OS/2 using the PM GUI for the user interface and kernel level multi-threaded code for the infrastructure. The Systest Workbench uses 32 bit coding style and compilation for performance considerations. Code is written in C++ to allow all the usual benefits of an object oriented language as well as access to existing C libraries. Each sub-library will be described separately as a black box to the rest of the system.

All libraries employ data hiding to prohibit the external user from tampering with the data inappropriately. All libraries utilize multiple data segments (one per process accessing the library) to reduce catastrophic errors and confusion. Shared segments are explicitly stated as such. Since global variables in the OS/2 multithreaded environment are dangerous due to concurrent access problems, they are allowed only when absolutely necessary, extensively documented, and properly protected.

Data hiding is achieved through the C++ style interfaces with private data accessible only through class methods. The C style interfaces employ a handle passing mechanism wherever possible and then allow access to the data protected by the handle through function calls where the handle is the first parameter. Handles will be type defined as unsigned longs. Wherever possible, the handle will actually be a "this" pointer. In other words, rather than providing a C infrastructure with C++ wrappers, the present invention provides a C++ infrastructure with a C interface.

The user interface is assumed to be present at all times, however, its actual existence in the system is not necessary. If connection to the user interface cannot be achieved, the test scripts continue without interruption even though all messages to the user interface will be unanswered. In such a fashion, the Systest Workbench makes it possible to debug the test scripts (and the utility libraries) in development of interface libraries, and development of the test scripts. Obviously, when the Systest Workbench is running live tests, the existence of the user interface is required.

As previously discussed, the Systest Workbench is divided into 5 distinct sub-systems: user interface and system control (12); log/metrics and configuration database (28); system utilities (service layer) (18, 20, 22, 24, 26); test case generator (14); and hardware/software interface (16).

Each of the sub-libraries/modules are described separately below. Each description outlines the API's from a high level as well as specific functionality required. The utility libraries are addressed first, followed by the database and the user interface.

All C and C++ style methods and functions are labeled in subject-verb-object format where the subject is the library name abbreviation, the verb is the action being taken, and the object is the recipient of the action (if any). For instance, a function from the Binary Obtuse Balloon library that writes a string would be named BOB_Write_String. For C++ methods, the library name can be omitted due to the use of the class pointer before the method label. However, it should be noted that the library name label, which is typically the class name, may be incorrect for inherited classes due to polymorphism issues.

Libraries are written in C++ using class hierarchies wherever possible. However, because the user may be accessing the libraries from C or REXX, the interface also supports a C style calling convention over the C++ code. This is done by casting this pointer to a handle (unsigned long) and requiring the user to pass the handle to and from the libraries.

The REXX interface is supported as a layer above the C interfaces. Therefore, to get from REXX to the actual library functions it is necessary to go through the REXX layer to the C mapping functions and then to C++ calls. For the remainder of this document, the words, method and function are synonymous.

Referring again to FIG. 1, the interprocess communication utility library (UIPC) (24) is one of the base level libraries meaning that it is the lowest point in the library hierarchy. This library provides communication capabilities for process to process, process to sub-thread, thread to thread, test script to user interface, and machine to machine situations. Because the transport layer requires LAN traversal when moving between entities located on different machines, the library hides this from the end user as much as possible.

This UIPC library assumes peer to peer relationships. Needless to say, different OS/2 IPC mechanisms are used for different types of communication situations. Likewise, in this situation, the optimal method for the situation will need to be employed. However, the interface to whichever method is actually used has been standardized.

This library could simply allow connections to be made between entities as the user demands. The main drawback to this method is that connections must be developed between every process on the machine separately. With each thread having the ability to be individually addressed on the system, this could become a large number of connections that would expand exponentially as more entities enter the system.

Instead, a system of hubs (gateways) is provided to reduce the number of connections. All IPC is done on a requested basis meaning that messages are not retrieved unless asked for explicitly. This is in contrast to a more event driven methodology where a callback function would be defined to process unsolicited messages. All communication down to the thread level (in other words, everything) are eventually normalized down to OS/2 queues.

All messages are addressed by: [[machine{,}]:[process string{,}]:[process number{,}]:[thread string{,}]:[thread number {,}]{&}] so that a distributed environment can be supported. However, it would be unfair to the user to assume that they know all these fields. Therefore, leaving a field blank is acceptable and will simply get the message as close as possible. For instance, if the user leaves the machine name blank, the first assumption is that the destination entity is local. If it is not, the message is promoted to the next higher hub and the assumption is made that only one process of that name exists on the system. In this case, the message is passed to the first process matching the rest of the key string.

If a list of destinations is determined, the user can list multiple destinations by either a comma separating fields within the address or by chaining several addresses together. A copy of the message is sent to each destination specified.

The ability to broadcast is also supported by placing the "*" character in any field. A "who's there" style message is provided with the system so that a broadcast to a sub-set of all the connected entities on the network can be made that causes all matching entities to respond with their complete addresses.

Three hubs are provided to achieve this. The first hub is at the process level to facilitate interthread communication. This hub resolves all messages that match machine, process name, process number with the current process. No global memory is allocated and the message is placed on the queue of the entity found. The second level hub is at the machine level. On slave machines, this is in place of the user interface-system control module. On the master machine, this is user interface entity. This level resolves process to process requests on the same machine. Global memory blocks are used to get to this hub and down to the destination process. At the process level, the memory is normalized to locally allocated memory by the process level hub. The third level hub resolves machine to machine messages. This hub is the user interface on the master machine. Communication between machines is done over sockets on the TCP/IP network. This code is easily removed so that a new network transport layer can be added later like named pipes. Since the majority of the messages in the system will have something to do with the user interface process, it is only appropriate, to improve performance, that the user interface encapsulate all three hubs in one.

As stated above, the addressing methodology is very simple. The fields for the header portion of the UIPC are as follows:

| Field Name | Type | Wild Card | Default |
| --- | --- | --- | --- |
| Machine | String | * | Null |
| Process Name | String | * | Null |
| Process ID | Long Integer | −1 | 0 |
| Thread Name | String | * | Null |
| Thread ID | Long Integer | −1 | 0 |
| Transaction ID | Long Integer | none | 0 |

The additional transaction number can be defined by the application, but is totally ignored by the system except for debugging purposes.

Messages are packaged using an interactive API. Defaults are assumed for all message elements. A complete default message header resolves to the originator. An example of the message development protocol would be:

C++ EXAMPLE

UIPC message( );
message.SetMachine("packer");
message.SetProcessName("Hello world");
// Allow process ID to default to first "Hellow world" found.
message.SetThreadName("Forever Loop);
// Allow thread ID to default to the first "Forever Loop."
// Allow transaction number to default.

C EXAMPLE

UIPC *message=UIPC_Create_Message( );
UIPC_Set_Machine(message, "packer");
UIPC_Set_ProcessName(message, "Hello world");
// Set the process ID field to broadcast to all "Hello world"
// process.
UIPC_Set_ProcessID(message, −1);
// Set the thread name and thread ID so that all the threads
// receive this message.
UIPC_Set_ThreadName(message, "*");
UIPC_Set_ThreadID(message, −1);
// Allow transaction number to default.

Additional addresses and address elements can be added to the routing information through additional API calls. All address elements can be added to through Add{Machine|ProcessName|ProcessID|ThreadName|ThreadID} calls. Complete addresses can only be added through an AddAddress call which takes all of the fields as parameters.

Messages are dispatched from the process hub to the individual threads over queues to those threads. The user may wait on that queue for a message indefinitely, for a specific time period, or for immediate return if no messages exist. Though the UIPC functions are used for this, they map very quickly to the underlying OS/2 functions. When a message is determined to exist in the queue it can be retrieved into private data owned by the UIPC library but accessible to the end user through a handle or this pointer: UIPC_MESSAGE msg=UIPC_WaitForMessage(hUIPC, 0); The user may then use the handle to access the data elements in the message.

It is assumed that the individual entities on the network have some understanding that the data will be passed to them. Therefore, all data is provided to the user in two parts: an identifier defining the talking pieces, and a pointer to the block of data. Behind the scenes, a large number of messages are passed between the entities that the test scripts are not aware of and will never see. To differentiate these messages from the users' messages, the system defined messages are identified by numbers starting at 100000 and up. Because of this, the ID field is of type unsigned long integer. The data can be retrieved in any of three manners: i) as the identifier (UIPC_Get_Message_ID); ii) as the data only (UIPC_Get_DataOnly); and iii) as both pieces (UIPC_Get_Data). Likewise, the reverse set of messages can be used to put these elements into the message.

The process control utility library (UPC) (not shown) is used by test scripts/cases to register their execution to the rest of the Systest Workbench system as well as spawn sub-processes and threads. This library is comprised of two classes: i) a thread class containing thread id and process id, anchor block handle, message queue handle, string identifier, etc.; and ii) a derived class for processes with the additional elements of child thread identifiers in the form of a dynamic data structure and a process name string. The use of threads and processes is governed by the standard rules pertaining to OS/2. This interface library, however, insulates the user from many of the OS/2 housekeeping tasks and provides a means so that the spawned process could be either local or remote. Obviously, in the case of threads, the new thread of execution would be local. This limitation should be noted by the test script writer.

The Register Process (UPC Register Process) is used to alert the user interface that a new process has been started in the system. The Systest Workbench IPC library is used to accomplish the interprocess communication. This function is very similar to the UPC_Register_Thread function. A handle is returned to the application from this function call for the user process to identify itself with.

Every process in the system is assigned a name for easy identification at the user interface. This name is passed as a PSZ string into this method or as the parameter for the constructor. The main thread (thread 1) is identified as main at the user interface. The process command line arguments is also passed to this procedure. They may then be retrieved using a first/next/prev/last methodology.

Under the scenes, all scripts accessing the utilities libraries through C or C++ require an anchor block and a message queue handle. Determining which language test script is interfacing to the library is left for the developer. Regardless, a copy of these key handles are kept in the private data for this library or a method of retrieving them is supported.

This function uses the Systest Workbench IPC library to send a registration message to the user interface indicating the existence of a new test process. A response is not necessary since, for debugging purposes, the process may be run without the user interface loaded. Because the IPC library is invoked, this method initializes IPC communications and stores off the handle. A handle to the process block or the equivalent class pointer is returned. Note that the other libraries may call this library using this handle/class reference. Care is taken to allow them safe access.

A Register Thread (PC Register Thread) alerts the user interface that a new test script thread has been started. This is very similar to the PC_Register_Process method except that the arguments from the command line are not passed. The parameter block passed to the thread as well as a name identifier is passed to this method. The threads do not need unique string identifiers because the thread ID value is appended to the name in the form ": % d" to insure uniqueness. Like the PC_Register_Process function, this one also ensures that the thread is PM capable (anchor block and message queue). Additionally, the IPC library is initialized. A handle to the thread block or the equivalent class pointer should be returned.

Start Thread/Process (PC Start Thread and PC Start Process) are the two primary methods for spawning threads and processes. Parameters are passed to the started item through an argc/argv mechanism. Since threads can only accept a single parameter, usually a PVOID, the argc/argv method is mocked up at a higher level. Both these functions accept the name of the function for the thread or the executable name of the process to start. In addition, any parameters will be accepted. These functions are cdecl typed and accept a variable number of parameters. The parameters passed are packaged for the respective type of argument parsing. DosStartSession is used for starting processes whereas _beginthread is used to start threads. A handle or class pointer is returned that allows the initiator access to the started entity.

End Thread (PC End Thread) is the method called before a thread ends in order for the user interface to reflect the change in status. Likewise, this change is also accessible to the process that started the thread. An error number can be passed into this function that is reflected at the user interface, log messages (if turned on), and is accessible to the process that started the thread. It is assumed that 0 indicates no error occurred. The return code is passed to the user interface and the class that the initiator of the thread refers to the thread through is updated. System resources are also freed. Nothing is returned from this function. The handle to the thread and/or class pointer is no longer valid after this call.

Exit Process (PC Exit Process) is the function/method used to terminate a test script process. This function is used primarily to alert the rest of the system that the process is no longer in action and to free system resources. An error number can be passed to this function so to alert the rest of the system of the final status of the process. The return code is passed to the user interface and any process that spawned this process. System resources are also freed. Nothing is returned from this function. The handle to the process control data is no longer valid after this call.

A number of additional methods are also available from this library mainly to allow access to process and thread specific data. Because a process is a superclass of thread, most of the methods are derived from the thread class. For the C interface, two distinct sets of functions are defined. For thread class, some of the more pertinent methods available (in C++ terms) are: i) Get Thread ID (TID); ii) Get anchor block; iii) Get message queue handle; iv) Get thread string identifier; v) Get and set thread status; vi) Retrieve IPC system handle; and vii) Retrieve pointer to parent process class (if not thread 1). It should be noted that thread status is a user defined field. It defaults to 0, but can be modified by the user to indicate that specific states have been achieved or that error conditions exist on a thread basis. This is not controlled with the alarms or metrics. For process class, some of the more pertinent methods available (in C++ terms) include all of the above as well as: i) Get process ID; and ii) Get and set process status.

Distributed processing is an important aspect of the STW. The process control sub-system is affected in that the ability must be available to start remote processes as if they were local. For this to occur, the user must be able to determine that a legitimate reason exists for starting the process on a remote machine. To further encapsulate this processing, the configuration utility handles this processing because it is the only part of the system with adequate knowledge of where specific resources are located. A portion of that library is built on top of the process class allowing the user to start processes on machines where resources exist.

The synchronization library (USYNC) (18) is used by the test scripts to ensure that test events occur in a controlled order on multiple asynchronous threads or processes. It is also used to control timing of events such as spawning scripts, making calls, polling files, etc. Four types of synchronization elements are provided: i) mutual exclusion semaphores; ii) event semaphores; iii) synchronization point semaphores; and iv) periodic event generation. Event semaphores are used to support everything except for the mutual exclusion semaphore situations. Network semaphores are provided to allow processes and threads executing in a distributed mode on the network the same level of service that the locally executing processes and threads enjoy.

The synchronization point (Sync-point) API service uses event semaphores as the backbone. In this scenario, threads register themselves as users of a particular synchronization point service as they start-up. Later in the test, one of these threads can request a sync-point. When this occurs, all threads must hit a similar sync-point in their test scripts before any of them are allowed to continue. The sub-system keeps a count of the number of active subscribers to the service and ensures that all the subscribers are accounted for before the continue event is posted.

The system is supported using a simple data structure. This structure is created by the first subscriber registering that a sync-point will be used. All the sync-points are organized in a tree structure at the system control (user interface executive). As more subscribers register with the same sync-point name, a counter is incremented in the structure and an event semaphore is created for each. The event semaphores area also stored off the base structure. When a sync-point is requested by any of the subscribers, the thread making the request is set to wait on the event semaphore until all other subscribers respond. As subscribers each make their sync-point requests, another counter is incremented and they each go to sleep until all threads have checked in. When all subscribers are accounted for, their respective semaphores are posted as quickly as possible so that they each resume processing as close to the same time as possible. Support is provided to handle situations where one of the subscribers either no longer exists or unregisters their handle to the sync-point. In that event, the rest of the sync-point waiters need not wait infinitely for the process that no longer exists. For such purposes, the following API calls and their C++ equivalents are provided: i) SP_Register_Subscription; ii) SP_Unregister_Subscription; and iii) SP_Sync_Point.

Event semaphores are simply a layer above the OS/2 event semaphore API. The difference between the event semaphores and the sync-point service is that the event semaphores can artificially dictate the poster and receiver of the events. The following API calls and their C++ equivalents are provided to support this: i) EVNT_Create_Sem; ii) EVNT_Open_Sem; iii) EVNT_Post_Event; iv) EVNT_Wait_Event; and v) EVNT_Close_Sem. Time-outs are supported as well as retrieval of multiple events (these are counting semaphores). Network event semaphores are also supported.

Mutual exclusion (mutex) semaphores are not as heavily used as event semaphores and their variations. Mutex semaphores are typically used to protect common resources from simultaneous access. Because the configuration and allocation libraries ensure that only one handle to any resource is available to any test element, additional protection of resources may not be heavily required. In an attempt to be complete, however, this library has been provided. The user simply creates or opens a mutex semaphore. When the common resource is about to be accessed, the user will "request" the mutex semaphore through its handle. When the common resource is no longer being accessed, the mutex semaphore is "released." For such purposes, the following API calls and their C++ equivalent functionality are provided: i) MUTEX_Create_Sem; ii) MUTEX_Open_Sem; iii) MUTEX_Request_Sem; iv) MUTEX_Release_Sem; and v) MUTEX_Close_Sem. Time-outs are supported as well as network semaphores.

Automatic event generation is a variation of the event semaphore system where events are generated automatically based on some user defined process. This is provided so that users can develop scheduling mechanisms based on status or random events. This takes the place of a timer delay.

For such purposes, the following mechanisms are supported: i) Timed Events—Events occur a certain amount of time from each other. Events continue infinitely or until the event generator is closed; ii) Random Events—Events are triggered to occur within a tolerance level set as a minimum and maximum amount of time between events. Events occur infinitely until the event generator is closed; iii) Bell Curve—Events are triggered based on a bell curve graph. Elapsed time, low end event distribution time, and high end event distribution time are specified. Events start at the low end, increase to the high end, and then taper off again; iv) Boat Curve—This is the same as the bell curve except that the high and low ends are reversed. The events are triggered rapidly at the beginning and end of the elapsed time period but slowly in the middle; and v) Poisson Distribution—Events are guaranteed to occur in a lopside bell curve where the top of the bell does not occur in the middle of the time period. Parameters are specified as the minimum time between events, maximum time between events, and the total elapsed time. The API and C++ equivalent calls are: i) AEG_Create_Timed|Random|Bell|Boat|Poisson; ii) AEG_Wait_Event; and iii) AEG_Close.

With regard to distributed functionality, all of these services can operate across the network (except for the automatic event generation). This is done through the slaves on the remote machines and the system control user interface on the master platform. All semaphores are determined to be network unique names. The network code is not invoked, however, until there is an indication that a remote user of the semaphore exists All semaphores are registered with the master control portion of the system upon creation. Slaves report semaphores local to their platforms upon creation. If no inter-machine semaphores of the same name exist, the slave retains control of the semaphore. When inter-machine semaphores are found, the slaves relinquish control to the master.

A dialog is provided between the master and slaves to support this interaction. At the local machine level, however, inter-process communication should be minimized as much as possible as the inherent OS/2 semaphore code is powerful enough to satisfy the application methods.

Still referring to FIG. 1, the Systest Workbench also includes a Logging Utility Library (ULOG) (26). In that regard, it should be noted that user log messages are nearly impossible to determine in a generic manner. As a result, this library provide a method for the test engineers to specify exactly the message format and content that they require for their projects.

The user has the ability to build their own classification groups for messages based on whatever criteria they identify. Typically, these groups would be based on the very specific aspect of the test being performed of the function in question. As the tester becomes more comfortable with the validity and reliability of the tests, it is assumed that they will require less and less feedback from the test scripts. However, taking the messages out of the scripts is not an option because they may be required at some point in the future. To accommodate the testers, their messages can be classified by a level of testing as well by a small character string. The user interface then allows messages to be turned on and off based on either the level or the particular message.

The user is required to register their message with the system, though this is a preferred method. The user interface has no knowledge of any message until either the message is used or registered in a test script. The level of output can also be set in the register message function, however, the stored database level from previous levels always overrides these values. The initial values are only useful for when the database is purged and all the previous settings are lost.

Messages are usually free from strings created with a print style or stream methodology. Binary data can also be logged through special log message calls regardless of the message type, time, date, and origination point are all recorded automatically in addition to the users message. For these purposes, the following API calls and their C++ equivalent are supported: i) ULOG_Register_MessageType—Takes a message string and initial level. Level is ignored if the message was previously registered or used; ii) ULOG_Log_Message; and iii) ULOG_Log_Data.

The Systest Workbench also provides a Metrics and Counters Library (UMET) (26). Metrics and counters are typically used by the test engineer to determine the success and failure of a particular test. The test engineer may access to counter style metrics as well as timer style. Metrics are defined to the system through a registration call. This call defines the metrics as either counter or timer style and assigns a label to the metric. The user is returned a handle to the metric.

Counter metrics can be incremented, decremented, or cleared. Timer metrics are started and stopped. When the stop call is made, the metric is stored as the start and end times. For such purposes, the API calls and equivalent C++ calls that are supported include: i) MET_Register_CounterMetric; ii) MET_Register_TimerMetric; iii) MET_Increment_Counter; iv) MET_Clear_Counter; v) MET_Decrement_Counter; vi) MET_Start_Timer; and vii) MET_Stop_Timer.

The Systest Workbench still further includes an Alarm Library (ALRM) (26). Alarms are simple counters used to indicate that some error event has occurred. The user interface displays a matrix of the alarms which could occur on the system. When an alarm occurs, the user interface immediately reacts to the occurrence and alerts the user. Alarms must be registered before they are triggered. However, they only need to be registered once in any test run. Alarms can only be cleared by the user interface and triggered only by test scripts. When an alarm is triggered, the originator of the alarm and the time it occurs are sent to the user interface and database. Alarms are identified in the registration and trigger functions through their text string identifiers. The user interface keeps a record of all the alarms which can occur. When the test script registers an alarm, a message is passed to the user interface for that alarm. If no alarm has been registered by that name, a message is logged instead. The only two API operations required by the test scripts needed are a registration function and a trigger function.

The configuration management library (UCFG) (22) is one of the items which is modified for each new device type that Systest Workbench is capable of interfacing with. It is used to query information about device as viewed by test scripts. Because devices are never exactly the same, API functions are defined as needed. Devices (hardware or software) are identified to the system by name. The database stores both descriptions of the individual devices as well as information about how many devices exist on the system by type and by machine. Information about whether a given device has already been allocated is also stored is part of the generic information about a device.

The configuration library allows the test engineer to query information about a specific device or about a family of devices. Query commands which are supported include: i) CFG_Query_DeviceInfo—A new function or method will need to be developed for each device type; ii) CFG_Query_DeviceCount—Determine the total, allocated, and free devices of a particular count; iii) CFG_Lock_Device—Locks a device so that it cannot be allocated except with a special key. This is a mechanism for reserving a device for later use; iv) CFG_Unlock_Device; and v) CFG_Find_FreeDevice—Locates a free device of a particular type somewhere on the system. Methods are also provided to scroll through all devices on the system. The allocation library supplies a function that is capable of allocating a previously locked device.

With respect to distributed processing, the configuration library also provides the additional functionality that is required to start processes on remote machines. A resource is first identified on a remote machine. It is then locked so that no one can allocate it unannounced. A process is then started on the remote machine where the resource is located. As part of this special start-up, a message is passed directly to process with the key to the locked resource(s) on that remote machine. The remote process uses the key to allocate the necessary resources and commences the test.

There is a fair amount of inter-machine and inter-process communication which needs to occur in order for this to work correctly. While the process starting the remote (or perhaps local) process can be aware of the remote situation, it does not have to do so. Instead, the messages passed to the remote application are not intercepted by the application itself but are intercepted by the configuration library in that application and used when the allocation library attempts to allocate a resource of the predetermined type.

In that regard, message passing may begin with the remote process being started by sending a message to a slave process on a remote machine. The process is started in such a way that indicates that though it has been started, it should not pass control to the test script yet. Thereafter, the process is started and confirmed by a message passed to the parent process. The slave process then sends a message back to the process which spawned the remote process indicating that everything has started. Next, the host process packages up all the keys necessary to allocate the remote resources and passes them directly (as direct as the IPC library is) to the remote process. Finally, when the keys are retrieved, the configuration library intercepts the package. This is also the sign to the remote process that it can turn over control to the test script.

It is important that the test engineer be insulated from this process as much as possible. Therefore, a powerful function to locate resources, lock them, and start a test script wherever that happens to be is provided as a single API call. An example of such a call is as follows:

```
BOOL CFG_Start_Process(char *ProcessName,
                       char *args,
                       int ResourceCount,
                       . . .);
```

All of the above process occurs before the function returned. Note that since the number of devices required cannot be predetermined, this function is capable of accepting a variable number of device type ids.

The Allocation Library (UAL) (20) works in conjunction with the configuration library (22) to allow test scripts access to the hardware and software devices necessary to test the system under test. Since each device type has specific attributes in the form of data elements and methods unique to that device, this library cannot be completely described since some of those attributes may need to be considered when defining library calls. Nevertheless, a base abstract class has been used to facilitate prototyping some of the main allocation library functions.

This library is mainly used to form a bridge between the interface libraries and the test scripts. When the user allocates a device, this library makes the bridge to the device drivers and returns a handle to the application for a device. It also marks the device as allocated so that no one else can allocate that device until the current script frees it. The marking is done at the database level. After the test script is finished with the device, the allocation library releases the device back to the system by unmarking the database entry for that device and destroying the handle to the device.

Certain initialization (creation) methods will need to be executed to get the device going before the test script even gets the device's handle. Likewise, most devices will have some termination (destructor) code to perform in order to close out the device. The allocation library calls the virtual function in the base device class which is defined elsewhere to be a legitimate constructor and/or destructor style method.

Finally, the allocation library (20) also completely shuts down all devices open for a process should the process either forget to do so or shutdown unexpectedly. This is done by creating a list at the process level for all devices allocated by that process. As devices are released back to the system, they are removed from this list. On exit, all remaining devices in the list are destroyed. The allocation library registers an exit list function to accomplish this on initialization.

The allocation function appears as: DEVHANDLE UAL_Allocate_Device(LONG DeviceType, ULONG Wait); However, this function implies that it is allocating any device of this type. If the user requests a specific device by some key piece of information about the device, obviously a custom allocation function is required. All allocation functions support a parameter allowing them to wait for a device to become available. This parameter is the time to wait in terms of milliseconds. Two special values are: i) 0—return immediately. If no device of that type was available, the device handle is set to an error value; and ii) −1 (0xffffffff)—wait indefinitely for the device to become available and return only when one becomes available. The free/release command will appear as: BOOL UAL_Release_Device(DEVHANDLE devHandle);

With respect to distributed processing, the configuration library (22) can lock specific devices for allocation by a process in response to user requirements. In that case, the user has determined that multiple devices are required by a script prior to starting that particular script. When this occurs, those devices are locked for that script. The allocation functions first check if any devices of the type being requested have already been locked by the configuration library. This is done without the test script being aware that it is occurring.

Because devices are very heavily accessed by test scripts, the allocation of devices which are not local to the test script is not supported. In such a fashion, the increased network traffic and the delay that that entails will not adversely affect the tests and skew the results by throwing off the timing.

The Systest Workbench also includes a database (28) that is in a relational model using the Paradox (Borland) database file format. This allows the users of the system to either use the Systest Workbench system or the Paradox interactive user interface/PAL to access their test data.

Unique identifiers are also provided as needed to properly relate two tables. Typically, tables are related using a field in the master table which is predetermined to be unique to that table. Usually, the identifying field is entered by the user or is in some way pertinent to the data of that table. In this application, however, where speed and space considerations are very pressing, the relation fields need to take as little space as possible and enable the quickest access.

For this application, a method is provided to generate these unique identifiers on behalf of the rest of the system based on clock data and time values. The 'C' runtime library function for time returns the time in the number of seconds since Jan. 1, 1970. This number is not due to roll over for a few years so it is relatively safe to assume that this is a safely unique identifier for most data applications for this system except for those possible items which occur quicker than one per second. Where this document refers to a unique ID value, it is defined as the time that the record was created. No other inherent value is based on those fields since they are only being used to facilitate the joining of multiple tables.

A large part of the usefulness of the output messages and the system history data elements is the recording of not only when an event occurs, but from where it originated. This is interpreted for this system as the machine, process, and thread where the event occurred. The database represents these fields in a single composite field of a short character string (10–20 characters) for the machine name followed by two integers for the process and thread ID's. Fixup for process and thread names is done later in processing.

The main data elements can be grouped as follows: i) Test Management and History Data—This will include data about the system under test (version of the software, etc.), test dates, operator comments about the tests, test script data, and test summary data; ii) System Configuration—Data will be stored regarding the topology of the Systest Workbench system in regard to the network layout, devices on each machine, and the various ways that the devices can be used. For instance, a Dialogic device could be used as either a Voice Dial device or a Voice Mail device but not both at the same time; and iii) Test Output—Logs, Metrics, and Alarms all are stored in the database.

Each of these groups of data is not stand-alone and references between groups is to be expected. When disk space begins to run out, the test output tables are summarized and then purged in blocks. When that can no longer occur, summary records are purged in blocks also. Eventually, the test is aborted or executed without data being saved.

Data stored in the test management and history data group is used primarily by the test engineer to keep track and map test success and failure rates of the system testing. The test engineers test and code scripts to execute the individual tests. It is assumed then that there are one or more test scripts associated with each test performed against the system. A test in this case is described as a scenario because it may include the grouping of various scripts to drive the system with a very specific set of circumstances.

Though the test history portion of the database may not map directly to current available test processes, the intent is that as the processes change, this product will not. The database provided here is flexible enough to be useful even if the official testing process changes by allowing outside access to the database and by employing common normalization techniques to the database design.

The first table involved stores records describing the system under test. Records stored in this table are used mainly as a place marker:

| Master System Table - msysproj | |
|---|---|
| System Name | System Version |
| char 80 | char 80 |

For each system under test, a number of test scenarios may be developed. Each scenario is maintained as a separate record in this table:

| Test Scenario Table - testscen | | | | | |
|---|---|---|---|---|---|
| System Name | Scenario Name - Key | Author | Creation Date | Modification Date | Test Type |
| char 80 | char 80 | char 40 | date/time | data/time | char 20 |
| Id Key | Requirement ID | Specification ID | Test Method | Test Basis | Description |
| Unique ID | char 10 | char 10 | char 80 | char 80 | memo |

The test type field indicates how the test is launched from the system control user interface. These map to the following initial methods:

| Identifier | Description |
|---|---|
| single | Single script start. One single script is launched starting a test. An optional loop count is supported so that the script will be relaunched when it completes. |
| gserial | Group script start in serial. A number of script are set up to be launched in a particular order. Each script is started only after the previous script completes. An optional loop count is supported so that the group will be relaunched when the last script in the group completes. |
| gparallel | Group script start in parallel. A number of scripts are started all at the same time and allowed to complete. A flag to infinitely restart the scripts when they complete is supported as well as a flag that will indicate that all scripts need to complete before the relaunch is performed. |
| xxxxx | As new script launching methods are indicated as needed by the users, additional launch methods will be developed. Such launch methods will be developed as DLL link in pieces thereby reducing the need for changes to be made to the user interface code. |

It is assumed that the DLL launching method will work. Therefore, to allow access to the specific launch mechanisms and to allow these mechanisms to be loaded at run time thereby eliminating entirely the need to change code in the user interface executive, the following table provides the link to the launch code DLL. It is not accessible to the user through the user interface:

| Launch Module Table - launch | | | |
|---|---|---|---|
| Identifier Name | Long Name | Description | DLL Name |
| char 20 | char 40 | memo | char 20 |

For simplicity, all launch DLL's supply a common function call as their start-up. The name of the function is not important as long as it is consistent.

It is generally understood that each test launch piece of code has different data requirements as far as which test scripts are launched and in which order, etc. However, each has a database table with that information in a format that it is capable of reading. In other words, no attempt has been made to develop a standard database table for all launch methods.

A record of all tests is kept as well as links to the results of said test. After a test completes, it is possible for the test engineer to comment on the test and to store that information as part of the testing history. There is one record in this table for each test scenario executed from the user interface as that will indicate an autonomous test.

| Test History Summary Table - thistsum | | | | | | | | | |
|---|---|---|---|---|---|---|---|---|---|
| Test Instance Unique ID | Test Start Date and Time | Test End Date and Time | Test Scenario ID | Test Engineer Comment | Success or Failure Flag | System Revision Number | Test Rev. Number | Test Engineer | Build Tested |
| Unique ID | Date and Time | Date and Time | UID from testscer | memo | BOOL | INT | INT | char 40 | char 40 |

After a test is executed, a number of problems may arise. When this occurs, change requests (CR's) are usually generated to document the problems and start the process of fixing the errors. Therefore, linked to the above described thistsum table is the following table listing the generated CR's that a test produces:

| Change Requests Generated - crsgend | | |
|---|---|---|
| Test History Unique ID | Change Request Number | Description |
| ID from thistsum | ULONG | memo |

Likewise, it is very possible that a test will be run to verify that a change was made correctly. This is also recorded in the database as a list of CR's that are resolved or proven by the retesting of the system:

| Change Requests Resolved - crsrsvd | | |
|---|---|---|
| Test History Unique ID | Change Request Number | Resolution Comments |
| ID from thistsum | ULONG | memo |

The Systest Workbench system is configured through the user interface system into the database. This configuration includes both the system layout in terms of machines available and specific devices available on each machine. The system becomes somewhat complex with the possibilities that a single hardware device could be used differently by higher level interface libraries. For instance, it is possible that a set of 10 phones could be accessed as either 10 AIN phones or 10 Voice Dial phones or 5 of each.

Starting from the top down, the machines are the first things which are described to the system:

| Machine Configuration Table -- machcfg | | | | |
|---|---|---|---|---|
| Machine Name (TCP/IP Network Name) | TCP/IP Address | Unique ID Field | Description | Master or Slave Usage |
| char 20 | char 30 | Unique ID | memo | char (S/M) |

Each machine has a number of hardware devices associated with it. Each hardware (or software) item is identified by a record in the following table. If a resource is seemingly infinite, such as a software device or a TCP/IP socket, a separate record is still required for tracking purposes:

| Hardware Port and Software Items Table -- hports | | | |
|---|---|---|---|
| Unique ID | Name of Entity | In Use Flag | Detailed Description of Table ID |
| Unique ID | char 40 | BOOL | Unique ID of detailed description file |

As devices are added to the system they will be further described by their own tables. A cross reference table of the above described high level table to the data files containing the port or software specific information is:

| Detailed Description of Entities Cross Reference Table -- detxfer | | |
|---|---|---|
| Entity Type Name | Unique Identifier for Type | Details Table Name |
| char 40 | Unique ID | char 20 |

Above or around these tables are the various usages for the entities as based on what interface libraries are available to the system. A number of cross reference memory structures are required to ensure that resources are not multiplied and simultaneously allocated. Therefore, the database is only concerned with describing the devices.

Devices (hardware or software) are further dereferenced by the interface libraries. These libraries come in three types: 1) Direct—The lowest layer. This is always one layer above the actual device and is always a one to one relationship with the hardware or software entity; 2) Functional—This library type is a layer above a direct library. It is also possible that these will be layered on top of each other; a functional library can be a layer above another functional library; and 3) Hybrid—These libraries are used to make two or more devices acts as if they were a single entity. This library type can rest on top of either functional or direct libraries.

To minimize confusion, the direct and functional libraries are described in the same table. The hybrid libraries are represented in another table. These tables very simply describe what libraries are available and who or what they sit upon. The user interface reads and interprets these files and builds the necessary cross reference tables at run time.

| Interface Library Table -- intrlibs | | | | |
|---|---|---|---|---|
| Interface Library Name (Long) | Interface Library DLL Name | Unique ID for This Library | Hardware Type or Interface Library Below This One | Lowest Layer Flag |
| char 80 | char 15 | Unique ID | Unique ID | BOOL |

If the lowest layer flag is true, then ID in the hardware type or interface library below field is a hardware type identifier. If it is false, the hardware type or interface library below field is the reference to another record in this (the intrlibs) table. This will allow a virtually infinite number of interface libraries to be stacked on top of each other.

Hybrid libraries are described differently in the database to allow for multiple sub-libraries to be represented. Because the number of sub-libraries that are interfaced to is not pre-determined or limited, two related tables are used to represent this:

| Hybrid Library Header Table -- hybrhdr | | |
|---|---|---|
| Hybrid Library Name (long) | Hybrid Library DLL Name | Unique ID for this Library |
| char 80 | char 15 | Unique ID |

The following cross reference table links the hybrid libraries to subordinate interface libraries:

| Hybrid Interface Library Cross Reference -- Hybrxref | |
|---|---|
| Hybrid Library ID | Interface Library ID |
| Unique ID | Unique ID |

Under the scenes, there is a need to store some information that is not of primary relevance to the user, but which must be gathered to hold the rest of the data together. This application requires that a history list of all active threads of execution be recorded. This is an implied log message and is stored in the following table automatically:

| Test Execution History -- testexec | | | | |
|---|---|---|---|---|
| Test Scenario ID | Test Thread ID | Machine Name | Process Name | Process ID |
| Unique ID from testscer | Unique ID | char 40 | char 40 | ULONG |
| Thread Name | Thread ID | Thread Start Time | Thread End Time | |
| char 40 | ULONG | Date/Time Stamp | Date/Time Stamp | |

This table is used primarily to indicate the originator of log messages, metrics, and alarms as well as to recreate the test in post-mortem situations. Essentially it includes the information as received by the user interface during test execution that drives its display.

Three types of data are stored in this part of the database. The first is the log file data. Log messages are stored either as strings of data or as references to data files on disk. In addition to the user's data, the exact originator of the log messages, the time and date of the message, the test that made this message, the message type identifier, and the message level are all stored with the message. Because of space considerations, this implementation which could be done with essentially one table is normalized down considerably.

All of the test output tables eventually reference the test scenario table. This is so that the user interface can preload all the necessary log, metric, and alarm types when the test scenario is chosen to be run. This is also useful for post-test analysis where the actual test scenario would otherwise be difficult to ascertain:

| Log Message Types -- logtypes | | | |
|---|---|---|---|
| Log Message ID | Log Message Name (user generated) | Logging Level for this Message | Test Scenario ID |
| Unique ID | char 20 | INT | Unique ID from testscer |

| Log Message History - logmsgs | | | | | |
|---|---|---|---|---|---|
| Log Message ID | Test Instance ID | Originator ID | Message Time | Log Message Test (user generated) | External Data File Flag |
| Unique ID from log-types | Unique ID from thistsum Table | Unique Id from the testexec table | Date/Time Stamp | memo | BOOL |

Metrics are similar in format to the log messages. They are slightly more complex due to the number of different possibilities regarding how they are used. Metrics are stored as a history that can be recreated. Two types of metrics are available: peg counts and timed events. These are stored in separate tables to eliminate unused fields in records. As with the log messages, a dereference table is used to store the specific user defined (all) metrics. Separate tables are then used to store the peg count and timer metrics in a history format. Peg counts are recorded as increment, decrement, and clear activities:

| Metric Message Types -- mettypes | | | |
|---|---|---|---|
| Metric ID | Metric Name (user generated) | Metric Type (0 = Peg Count, 1 = Timer) | Test Scenario ID |
| Unique ID | char 20 | BOOL | Unique ID from testscer |

| Peg Count History -- peghist | | | | |
|---|---|---|---|---|
| Metric ID | Test Instance ID | Originator ID | Metric Time | Metric Action |
| Unique ID from mettypes | Unique ID from thistsum Table | Unique ID from the testexec table | Date/Time Stamp | char |

The metric action can be a "i" for increment, "c" to clear (zero), or "d" to decrement.

| Timer Metric History -- timhistt | | | | |
|---|---|---|---|---|
| Metric ID | Test Instance ID | Originator ID | Metric StartTime | Metric End Time |
| Unique ID from mettypes | Unique ID from thistsum Table | Unique ID from the testexec table | Date/Time Stamp | Date/Time Stamp |

A utility is provided in the user interface to summarize the metrics for a particular test. When this occurs, records are written to the following two files:

| Peg Count Summary -- pegsumry | | |
|---|---|---|
| Metric ID | Test Instance ID | Metric End Count |
| Unique ID from mettypes | Unique ID from thistsum Table | LONG |

| Timer Metrics Summary -- timsumry | | |
|---|---|---|
| Metric ID | Test Instance ID | Metric Average Time |
| Unique ID from mettypes | Unique ID from thistsum Table | ULONG (elapsed time averages) |

For the timer style metrics, the times are in terms of millisecond resolution.

Alarms are implemented in a similar manner with a dereference table listing the various alarms on the system and a separate data file with the actual alarms triggered. A summary table is also supported:

| Alarm Types -- almtypes | | |
|---|---|---|
| Alarm ID | Alarm Name (user generated) | Test Scenario ID |
| Unique ID | char 64 | Unique ID from tester |

| Alarm History -- almhist | | | | |
|---|---|---|---|---|
| Alarm ID | Test Instance ID | Originator ID | Alarm Triggered Time | Alarm Level (Warning, Error, Fatal) |
| Unique ID from almtypes | Unique ID from thistsum Table | Unique ID from the testexec table | Date/Time Stamp | FLAG (w,e,f) |

| Alarm Summary -- timsumry | | | | |
|---|---|---|---|---|
| Alarm ID | Test Instance ID | Warning Count | Error Count | Fatal Count |
| Unique ID from almtypes | Unique ID from thistsum Table | ULONG | ULONG | ULONG |

One possible enhancement to this system would be a cross reference field to a log message. This way an error message could have a textual description of the situation also.

As previously discussed, the System Control and User Interface (12) of the Systest Workbench is a Presentation Manager application. Its functionality falls within three categories: i) configuration and test information data entry; ii) real time display of test progress; and iii) post-test reporting of results. Each of these aspects are described in greater detail below.

The user interface uses a modified Multiple Document Interface (MDI) methodology. When tests are executing, data entry and reporting features are disabled to eliminate possible concurrent access problems. When a test is executing, all configuration data is read only and all test output data is write only.

The interface is a single application with an entirely point and click interface. Users of the system are allowed to modify the interface in regard to color, font, window size, and window position preferences. Furthermore, a switch to shut off confirmation messages is also supported for advanced users.

Data entry for the Systest Workbench system is mainly concerned with the configuration data. This data is presented to the user in container windows which allow for large amounts of data to be presented easily and quickly. Machines are represented as separate containers. Devices on machines are represented as container items within the machine containers. Different icons are used to represent the different types of devices (hardware, direct, interface, and hybrid).

The other part of data entry relates to the setting up of tests for execution and the setting of log message levels. When the user wants to start a test they select that action from the main menu. They are then presented with a list of all the available test procedures and/or the ability to add a new test procedure. Modification of an existing test procedure is also permitted.

After a test has been selected for execution, the user interface and system control (12) searches the database for all information (previous log message type, metric type, alarm types, etc.) and presents screens with that information to the user. If that information is not available as would be the case in a new procedure situation, screens are displayed but are void of data.

At this point the test has not started and the user is presented with an alarm matrix, metric summary, log message tracking window, and a control panel. The test will not have been started and the "start" button on the control panel is highlighted. The user is able to modify the log messages through a dialog box chained off the log message display window. Windows can be moved, resized, or minimized before the test starts.

The log message level setting dialog box lists all log message type as previously defined by test scripts as they are found in the database. The user is able to select a log message and change or review its level. A container window is provided which allows modification of that field for this application.

Real time test progress information is displayed to the user in a way that indicates the most information with the least amount of real estate. As stated above, all data entry is disabled as well as post-test reports to keep the system safe and to minimize the overhead associated with contention of common tables.

A single window is used to perform test master control and gain immediate feedback of the system layout. This window is preferably the main client window. As test processes and threads are started and stopped on the local and remote machines, the user can visualize this and query individually those items for specific information. This window shows each test process/thread on the system graphically. When the user moves the mouse to that item, they can either query specific information (process name, thread name, current activity, etc.) or perform an action such as stopping or pausing that thread of execution. As threads and processes are started and stopped this display updates in real time to display those changes. Likewise, when alarms are triggered from these entities, their color attribute change to reflect the level of crisis (yellow for warning, orange for error, or red for fatal). The other part of this window contains buttons for starting or stopping the system total and presents the user with test summary information in a very abbreviated format. A pull-down menu option allows for more in-depth feedback.

The user is able to view the log messages as they are logged to the database through a simple list box style window. Options are available to: i) forego the database writing of messages; ii) expand or reduce the amount of information displayed (time/data, originator, etc.); iii) change the logging level for a particular type of message; iv) clear some or all of the display or permanent log; v) interject a user message from the console; and vi) lock scrolling at the bottom of the list so that the latest messages are always displayed. Limits are placed on the size (number of messages) stored in the message box based on system constraints as well as performance considerations.

Metrics are initially displayed in a single window as a series of labels followed by the count totals or time averages for the particular metric. If the user clicks on any item, they are given the option of displaying the history behind that metric or the ability to clear the metric. Graphing the metrics in real time may also be provided.

Alarms are displayed using a simple matrix of buttons on a sizable window:

| Total Count (0) | Warnings Count (0) | Error Count (0) | Fatal Count (0) |
|---|---|---|---|
| Alarm Type 1 | # | # | # |
| Alarm Type 2 | # | # | # |
| Alarm Type n | # | # | # |

Each button displays a window when depressed listing the alarms which have occurred in that category. This window allows the user to clear the alarms either in the user interface or in both the database and user interface. Each button brings up a certain sub-set of the total alarms which have occurred. The Upper Left Hand Corner Button invokes the window with a list of all alarms on the system. The Warning, Error, and Fatal Count Buttons invoke the window displaying only the messages which fall into the severity selected but across all alarm types. The Message Type Buttons invoke the window displaying all the alarms of that type at each severity level. All Other Buttons invoke the window displaying all the alarms of a specific type and severity.

All buttons begin green. The total count button changes colors based on the highest severity alarm triggered. The message type buttons change colors based on the highest severity alarm triggered within that type. The total warning, error, and fatal count buttons change to yellow, orange, or red respectively as soon as an alarm of that severity is generated. All other buttons in the window change from green to their respective severity colors when the number of alarms of that type and severity is greater than zero. Additionally, text on the button always changes to indicate the number of triggers which fall within that group.

Menu items are available to this window to perform simple commands such as clearing everything or not writing to the database. Finally, this window may be iconized on the window workspace. When this occurs, it is displayed as if it were the total count button by changing colors and displaying the count correctly.

The user is able to perform a number of very specific post-test reports and utility oriented commands. One such report is test summarizing. It is assumed that after the test has been completed and all the data analyzed, the user will most likely want to summarize the test and purge all the detail data. The user may also perform test backup/purging/restoration. This is related to test summarizing. The user will also require the ability to completely dump the test detail results out to backup media (floppy disk), purge it from the database, and restore a test's detail information back into the system for further analysis.

The user may still further perform test playback. While everything cannot be captured, general information such as what was active on the system in terms of what processes and thread were running when an error occurred can be recreated based on what is in the database. The user is able to "playback" a completed test at a variety of speeds.

The user may also perform log message printing and dumping. The log messages are printable either in total or in a range for a test. Likewise, dumping the data to ASCII files is provided in a similar manner. A variety of metric reports are also available to the user. In that regard, the Paradox database front end allows the user access to all metric data. However, some reports that are available for ASCII dump or printing are summary and history reports based on ranges and selection of metrics reported on.

Alarm reports are also available to the user. An alarm report is not as complex as metrics. Support is maintained for ASCII dump and printing of summary and history reports with scoping of the selected data reported on. Complete tests reports are also available. Such reports are conglomerate summary and history reports in ASCII dump and printing capacities but without the ability to scope the items reported on. Additional reports and methods of output may be developed by the users as required based on their usage of the system.

The user interface is designed for quick and easy modification as users determine additional needs for the system. Scheduling of test launches and various methods of grouping tests are tied to the current processes in place to test systems. Since both these systems under test and the process used to test them will change, the launching methods, it must be assumed, will also require modification. The system is designed to allow these new scheduling methods to be plugged into the system through additional dynamic link libraries in such a fashion that no changes will be required in the base infrastructure.

Likewise, as new devices are determined necessary to interact with systems under test, they will be interfaced through a dynamic link library layer (or layers) that is driven by data from within the infra-structure.

Figure 3:
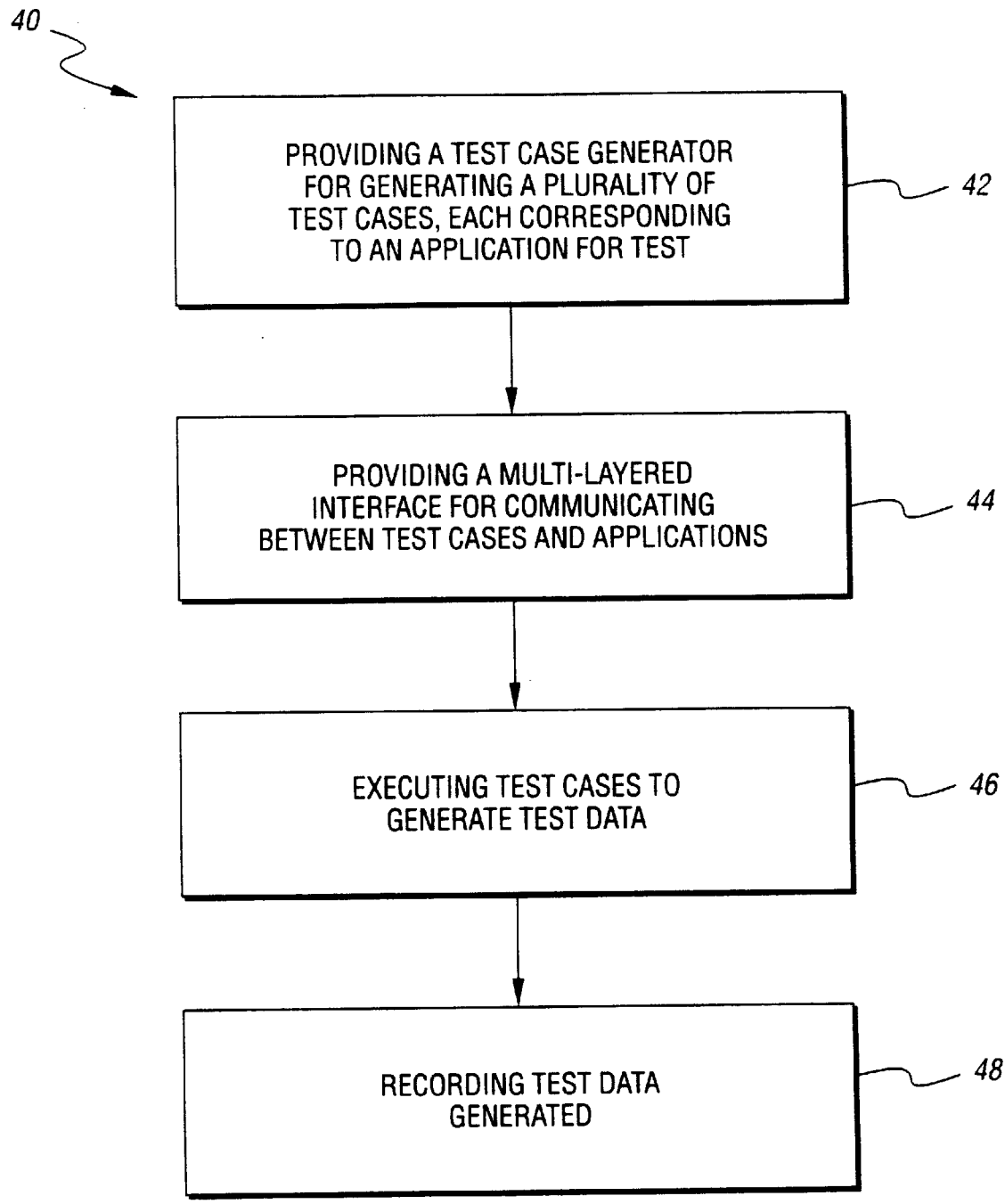
FIG. 3 is block diagram of the method of the present invention.

Referring finally to FIG. 3, a block diagram of the method of the present invention is shown, denoted generally by reference numeral 40. As seen therein the adaptable method for testing a plurality of applications comprises providing (42) a test case generator for generating a plurality of test cases, each test case corresponding to one of the plurality of applications, and providing (44) a multi-layered interface for communicating between corresponding test cases and applications. The method further comprises executing (46) the test cases to generate test data, and recording (48) the test data generated during execution of the test cases.

The test case generator provided (42) may comprise a plurality of test scripts. Executing (46) the test cases may itself comprise providing a user interface, and providing a controller in communication with the user interface. Executing (46) the test cases may also include providing a plurality of library utilities including, but not limited to an interprocess communication utility, a synchronization utility, a resource allocation utility, and a configuration utility. Recording (48) the test data generated may itself comprise providing a database, and providing a metrics/alarm library utility.

As is readily apparent from the foregoing description, the plurality of applications for testing according to the method and system of the present invention may include software and/or hardware applications. As is also readily apparent, the individual elements associated with these method steps and the means for performing those steps have been described in detail above.

In sum, the Systest Workbench has been built on the premise that change is inevitable and expected. Therefore, the Systest Workbench architecture has been developed in a very modular format so that it may be easily modified to meet the needs of future systems. In that regard, additional interface libraries can be added as new projects require the Systest Workbench for testing. Additionally, none of the infrastructure code or system control user interface code will need to be modified in these cases.

It is also probable that the systems under test in the future will not only be different, but also considerably larger. In that event, the Systest Workbench may be further adapted to handle the large demand by harnessing the power of a cluster of machines and/or by taking advantage of test equipment not on the OS/2 machine itself by connecting to that equipment over the network interface methods.

As is readily apparent from the foregoing description, then, the present invention provides an improved system and method for testing hardware and/or software applications. More specifically, the present invention provides an adaptable system and method for testing a plurality of applications.

It is to be understood that the present invention has been described in an illustrative manner and the terminology which has been used is intended to be in the nature of words of description rather than of limitation. As those of ordinary skill in the art will recognize, many modifications and variations of the present invention are possible in light of the above teachings. Therefore, it is also to be understood that, within the scope of the following claims, the invention may be practiced otherwise than as specifically described.

What is claimed is:

1. An adaptable system for testing a plurality of telephony based applications, the system comprising:

a test case generator including a plurality of telephony test scripts for generating a plurality of telephony test cases, each telephony test case corresponding to at least one of the plurality of telephony based applications, wherein the telephony test scripts are written in different languages;

a multi-layered interface including hardware, functional, and hybrid interfaces supporting the different languages for communicating between corresponding telephony test cases and telephony based applications, wherein the telephony test scripts interface with the telephony based applications through application programming interface (API) function calls through one of the hardware, functional, and hybrid interfaces;

a plurality of library utilities each interfacing with the telephony test scripts through API function calls for executing the plurality of telephony test cases so that the telephony test cases are coordinated to generate test data for the plurality of telephony based applications substantially simultaneously, the plurality of library utilities including a resource allocation utility library operable to allocate resources to the telephony test scripts after the telephony test cases have been executed;

a database; and a metrics/alarm library utility operable with the database for recording the test data generated during execution of the telephony test cases.

2. The system of claim 1 wherein the means for executing the test cases comprises:

a user interface; and a controller in communication with the user interface.

3. The system of claim 1 wherein the plurality of telephony based applications include software applications.

4. The system of claim 1 wherein the plurality of telephony based applications include hardware applications.

5. An adaptable method for testing a plurality of telephony based applications, the method comprising:

providing a test case generator having a plurality of telephony test scripts for generating a plurality of telephony test cases, each telephony test case corresponding to at least one of the plurality of telephony based applications, wherein the telephony test scripts are written in different languages;

providing a multi-layered interface including hardware, functional, and hybrid interfaces supporting the different languages for communicating between corresponding telephony test cases and telephony based applications, wherein the telephony test scripts interface with the telephony based applications through application programming interface (API) function calls through one of the hardware, functional, and hybrid interfaces;

providing a plurality of library utilities each interfacing with the telephony test scripts through API function calls for executing the plurality of telephony test cases so that the telephony test cases are coordinated to generate test data for the plurality of telephony based applications substantially simultaneously, wherein the plurality of library utilities include a resource allocation utility library operable to allocate resources to the telephony test scripts after the telephony test cases have been executed; and providing a database and a metrics/alarm library utility for recording the test data generated during execution of the telephony test cases.

6. The method of claim 5 wherein executing the test cases comprises:

providing a user interface; and providing a controller in communication with the user interface.

7. The method claim 5 wherein the plurality of telephony based applications include software applications.

8. The method of claim 5 wherein the plurality of telephony based applications include hardware applications.

* * * * *